United States Patent
Yamamoto

(10) Patent No.: US 9,983,368 B2
(45) Date of Patent: May 29, 2018

(54) OPTICAL WAVEGUIDE DEVICE

(71) Applicant: SHINKO ELECTRIC INDUSTRIES CO., LTD., Nagano-shi, Nagano (JP)

(72) Inventor: Kazunao Yamamoto, Nagano (JP)

(73) Assignee: SHINKO ELECTRIC INDUSTRIES CO., LTD., Nagano-Shi (JP)

( * ) Notice: Subject to any disclaimer, the term of this patent is extended or adjusted under 35 U.S.C. 154(b) by 0 days. days.

(21) Appl. No.: 15/454,440

(22) Filed: Mar. 9, 2017

(65) Prior Publication Data
US 2017/0293096 A1    Oct. 12, 2017

(30) Foreign Application Priority Data
Apr. 6, 2016    (JP) .................. 2016-076337

(51) Int. Cl.
G02B 6/42     (2006.01)
G02B 6/122    (2006.01)
G02B 6/12     (2006.01)

(52) U.S. Cl.
CPC .......... *G02B 6/4214* (2013.01); *G02B 6/122* (2013.01); *G02B 6/428* (2013.01); *G02B 2006/12104* (2013.01)

(58) Field of Classification Search
CPC ............ G02B 6/4214; G02B 6/4246; G02B 2006/12104
See application file for complete search history.

(56) References Cited

U.S. PATENT DOCUMENTS

| | | | |
|---|---|---|---|
| 6,285,808 B1* | 9/2001 | Mehlhorn | G02B 6/4214 385/131 |
| 7,263,256 B2* | 8/2007 | Kim | G02B 6/421 385/31 |
| 7,526,153 B2* | 4/2009 | Uchida | G02B 6/43 385/15 |
| 7,529,439 B2* | 5/2009 | Kim | G02B 6/4214 385/14 |
| 7,596,289 B2* | 9/2009 | Yamamoto | G02B 6/12002 385/14 |
| 7,680,367 B2* | 3/2010 | Matsuoka | G02B 6/43 385/129 |
| 7,734,124 B2* | 6/2010 | Yonekura | G02B 6/42 385/14 |
| 9,442,251 B2* | 9/2016 | Sakai | G02B 6/122 |

(Continued)

FOREIGN PATENT DOCUMENTS

JP    2011-118163         6/2011
JP    2015004855 A *   1/2015   ............ G02B 6/122

*Primary Examiner* — Daniel Petkovsek
(74) *Attorney, Agent, or Firm* — Rankin, Hill & Clark LLP

(57) ABSTRACT

An optical waveguide device includes a wiring substrate, a first cladding layer formed on the wiring substrate, a base protective layer formed on the first cladding layer and formed into a certain pattern, a core layer formed on the first cladding layer and the base protective layer, a recess portion having an inclined surface and formed from the core layer to the base protective layer, an optical path conversion mirror formed on the inclined surface, and a second cladding layer formed on the first cladding layer and the core layer. A refractive index of the base protective layer is smaller than a refractive index of the core layer. A width of the base protective layer is equal to or greater than a width of the core layer.

5 Claims, 13 Drawing Sheets

(56) References Cited

U.S. PATENT DOCUMENTS

| | | | | |
|---|---|---|---|---|
| 2011/0274388 A1* | 11/2011 | Yamamoto | ............... | G02B 6/43 |
| | | | | 385/14 |
| 2012/0141063 A1* | 6/2012 | Yamamoto | ....... | B29D 11/00663 |
| | | | | 385/14 |
| 2012/0318964 A1* | 12/2012 | Yamamoto | ....... | B29D 11/00663 |
| | | | | 250/227.11 |

* cited by examiner

OPTICAL WAVEGUIDE DEVICE

CROSS-REFERENCE TO RELATED APPLICATION

The present application claims priority from Japanese Patent Application No. 2016-076337 filed on Apr. 6, 2016, the entire content of which is incorporated herein by reference.

BACKGROUND

Technical Field

The present disclosure relates to an optical waveguide device.

Related Art

In the related art, an optical waveguide device has been known in which an optical waveguide configured to treat an optical signal is formed on a wiring substrate configured to treat an electric signal. The optical waveguide device is a photoelectric composite substrate, and can transmit the optical signal at a high-speed so as to make up for a limit of a transmission speed of the electric signal.

An optical path conversion mirror is arranged at an end-side of the optical waveguide, and an optical element is mounted on the wiring substrate so that it is optically coupled to the optical path conversion mirror of the optical waveguide.

[Patent Document 1] Japanese Patent Application Publication No. 2011-118163A

As described later in paragraphs of preliminary matters, in order to manufacture the optical waveguide device, a process of forming recess portions for obtaining optical path conversion mirrors in a plurality of core layers by a rotary blade of a cutting device is performed.

At this time, since the rotary blade cuts a lower cladding layer, too, for which the cutting is not required, the rotary blade is rapidly worn, which increases the cost.

Also, the rotary blade penetrates the lower cladding layer arranged below the core layers and reaches a wiring layer of the wiring substrate. In this case, a peeling occurs at an interface between the wiring layer and the cladding layer.

SUMMARY

Exemplary embodiments of the invention provide an optical waveguide device having a novel structure capable of reliably forming a recess portion for obtaining an optical path conversion mirror in a core layer.

An optical waveguide device according to an exemplary embodiment comprises:
 a wiring substrate;
 a first cladding layer formed on the wiring substrate;
 a base protective layer formed on the first cladding layer and formed into a certain pattern;
 a core layer formed on the first cladding layer and the base protective layer;
 a recess portion having an inclined surface and formed from the core layer to the base protective layer;
 an optical path conversion mirror formed on the inclined surface; and
 a second cladding layer formed on the first cladding layer and the core layer,
 wherein a refractive index of the base protective layer is smaller than a refractive index of the core layer, and
 wherein a width of the base protective layer is equal to or greater than a width of the core layer.

A method of manufacturing an optical waveguide device, according to an exemplary embodiment, comprises:
 forming a first cladding layer on a wiring substrate;
 forming a base protective layer having a certain pattern on the first cladding layer;
 forming a core layer on the first cladding layer and the base protective layer;
 forming a recess portion having an inclined surface from the core layer to the base protective layer by a rotary blade;
 forming an optical path conversion mirror on the inclined surface; and
 forming a second cladding layer on the first cladding layer and the core layer,
 wherein a refractive index of the base protective layer is smaller than a refractive index of the core layer, and
 wherein a width of the base protective layer is set equal to or greater than a width of the core layer.

According to the present invention, in the optical waveguide device, the base protective layer is formed into the certain pattern on the first cladding layer, and the core layer is formed on the first cladding layer and the base protective layer. The recess portion for obtaining an optical path conversion mirror is formed from an upper surface of the core layer to the base protective layer.

The recess portion is formed by cutting the core layer with the rotary blade. At this time, since the base protective layer is arranged below a part to be cut of the core layer, the first cladding layer is prevented from being cut by the rotary blade.

Thereby, since the rotary blade does not cut the first cladding layer for which the cutting is not required, the wear of the rotary blade is reduced and the lifespan thereof increases, so that it is possible to save the cost.

Also, since the base protective layer is arranged below a part to be cut of the core layer, it is possible to avoid a situation where the rotary blade penetrates the first cladding layer and reaches the wiring layer of the wiring substrate. Thereby, it is possible to prevent a peeling from occurring at an interface between the wiring layer and the first cladding layer in a region below the optical path conversion mirror of the optical waveguide.

DETAILED DESCRIPTION

Hereinafter, an exemplary embodiment will be described with reference to the drawings.

Before describing the exemplary embodiment, preliminary matters, which are bases of the present invention, are first described. It should be noted that the preliminary matters relate to personal investigation contents of the inventors and include a novel technology, not a known technology.

Figure 1A:
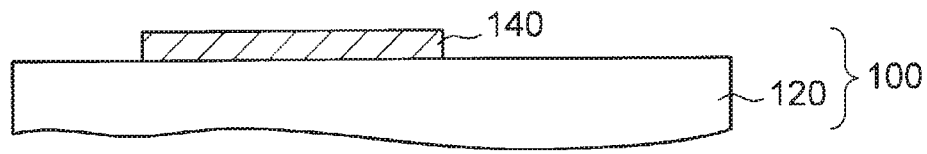
FIGS. 1A to 1D are sectional views depicting a method of manufacturing an optical waveguide device relating to preliminary matters (1 thereof).

In a method of manufacturing an optical waveguide device relating to the preliminary matters, a wiring substrate 100 is first prepared, as shown in FIG. 1A. In the wiring substrate 100 of FIG. 1A, an insulation layer 120 and a wiring layer 140 formed thereon are partially shown.

Figure 1B:
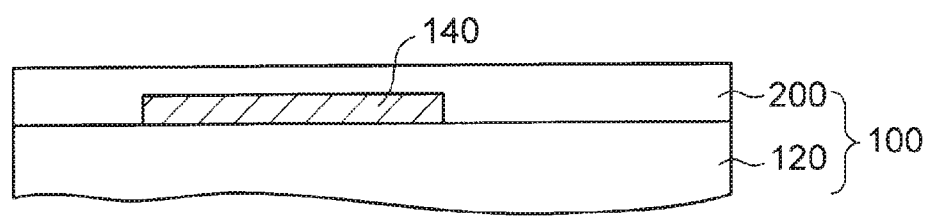
Figure 1C:
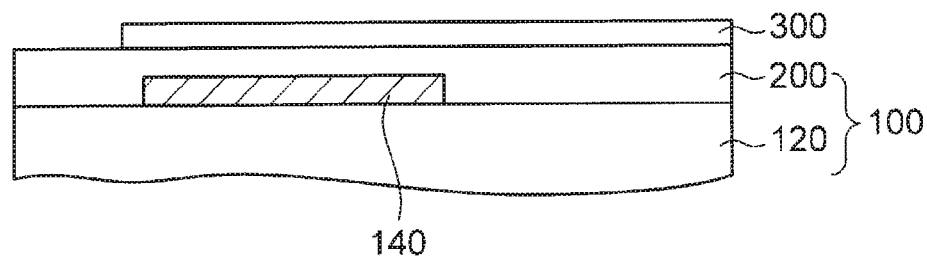

As shown in FIG. 1B, a first cladding layer 200 is formed on the wiring substrate 100. In addition, as shown in FIG. 1C, core layers 300 are formed on the first cladding layer 200.

Figure 1D:
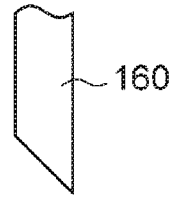
Figure 1D:
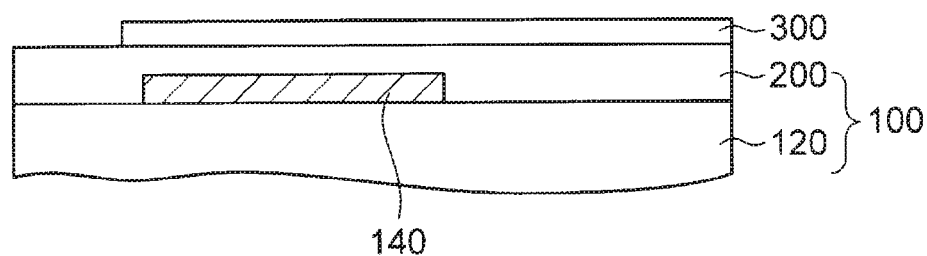

Subsequently, as shown in FIG. 1D, a portion at an end-side of the core layer 300 at which an optical path conversion mirror is to be arranged is cut in a thickness direction by a rotary blade 160 of a cutting device.

Figure 2A:
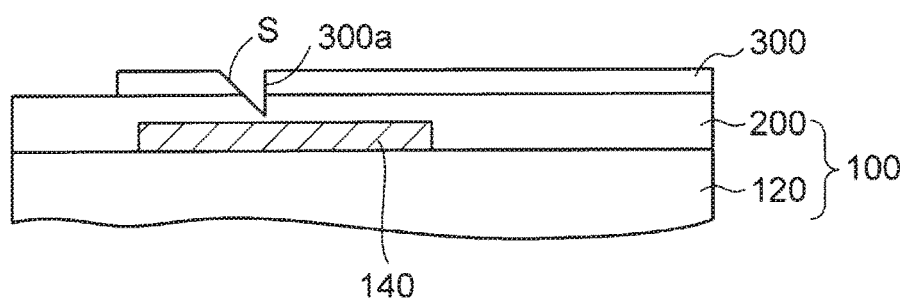
FIGS. 2A and 2B are a sectional view and a plan view depicting the method of manufacturing the optical waveguide device relating to the preliminary matters (2 thereof).

Thereby, as shown in FIG. 2A, a recess portion 300a is formed at the end-side of the core layer 300. A metal layer is formed on an inclined surface S of the recess portion 300a, so that an optical path conversion mirror is obtained.

The recess portion 300a divides the core layer 300 and is partway formed in a thickness of the first cladding layer 200, which is a base layer.

Figure 2B:
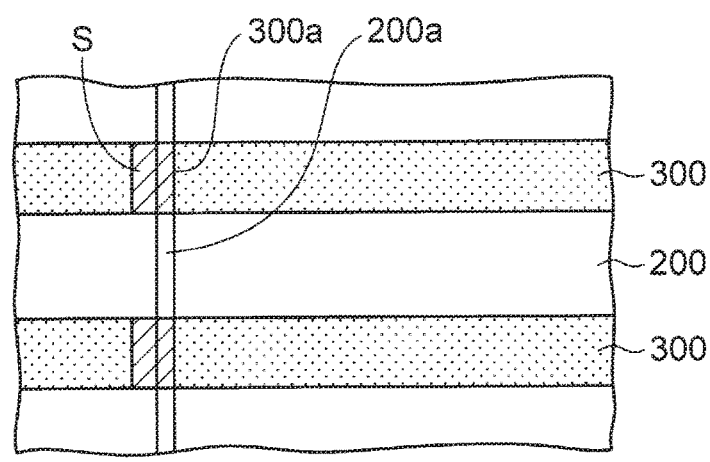

FIG. 2B is a plan view of a structure of FIG. 2A, as seen from above. As shown in FIG. 2B, the rotary blade 160 of the cutting device is moved in a direction perpendicular to an extension direction of the core layers 300, so that the recess portion 300a is sequentially formed in the plurality of core layers 300.

At this time, the rotary blade 160 cuts the first cladding layer 200, for which the cutting is not required, in a region between the plurality of core layers 300, too, so that a notch 200a is formed in the first cladding layer 200.

For this reason, the rotary blade 160 cuts the place for which the cutting is not required, over a wide range. Therefore, the rotary blade 160 is rapidly worn, so that a replacement frequency of the rotary blade 160 increases, which increases the cost.

Also, when the rotary blade 160 is worn, the favorable inclined surface S is not obtained upon the formation of the recess portion 300a and the recess portion 300a having a desired depth is not formed well.

Moreover, when forming the recess portion 300a in the core layer 300 with the rotary blade 160, it is necessary to completely divide the core layer 300, so that the first cladding layer (base layer) 200 is cut to some extent.

The first cladding layer 200 is relatively thin and a margin for a cutting amount is small. Therefore, particularly, when the warpage of the wiring substrate 100 occurs, the rotary blade 160 may penetrate the first cladding layer 200 and reach the wiring layer 140 of the wiring substrate 100.

When the wiring layer 140 of the wiring substrate 100 is cut by the rotary blade 160, the wiring layer 140 is deformed and a peeling occurs at an interface between the wiring layer 140 and the first cladding layer 200.

In an optical waveguide device of an exemplary embodiment to be described later, the above problems can be solved.

Exemplary Embodiment

Figure 11A:
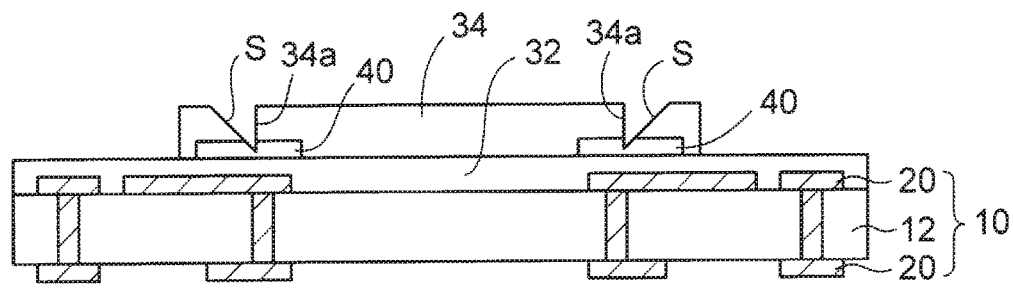
FIGS. 11A to 11C are a sectional view and a plan view depicting the method of manufacturing the optical waveguide device of the exemplary embodiment (9 thereof).
Figure 11B:
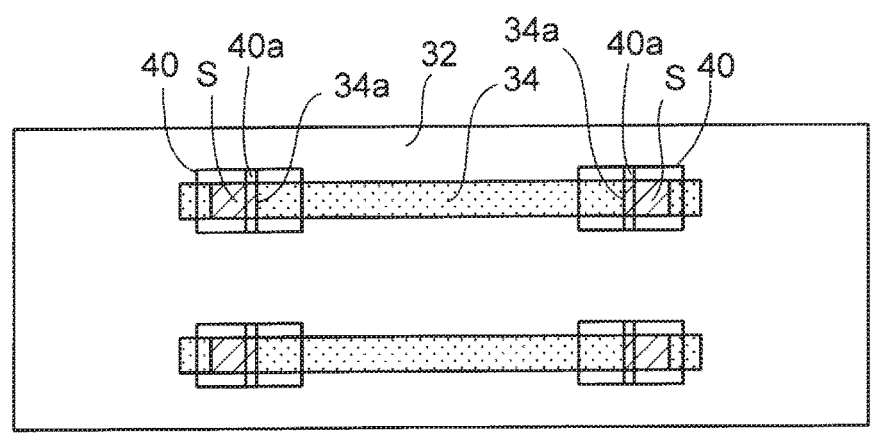
Figure 11C:
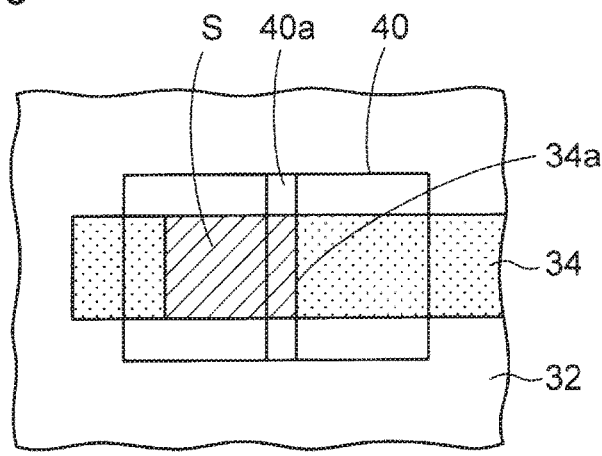
Figure 12A:
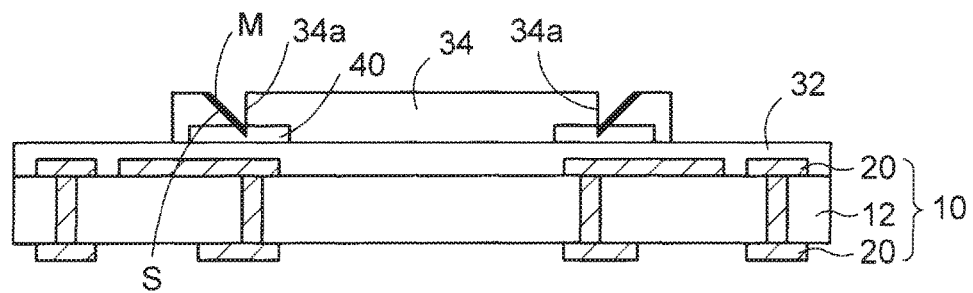
FIGS. 12A to 12C are sectional views depicting the method of manufacturing the optical waveguide device of the exemplary embodiment (10 thereof).
Figure 12B:
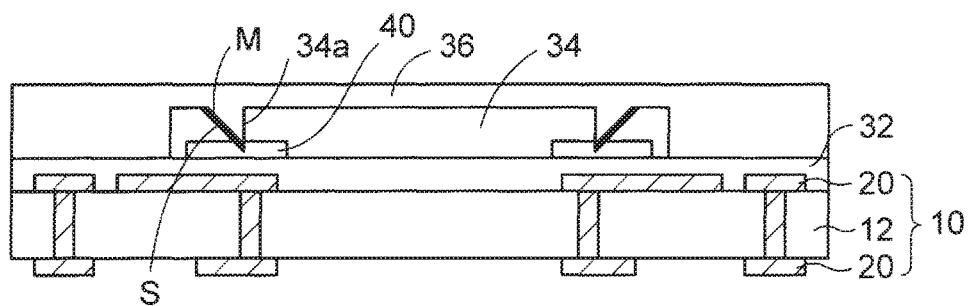
Figure 12C:
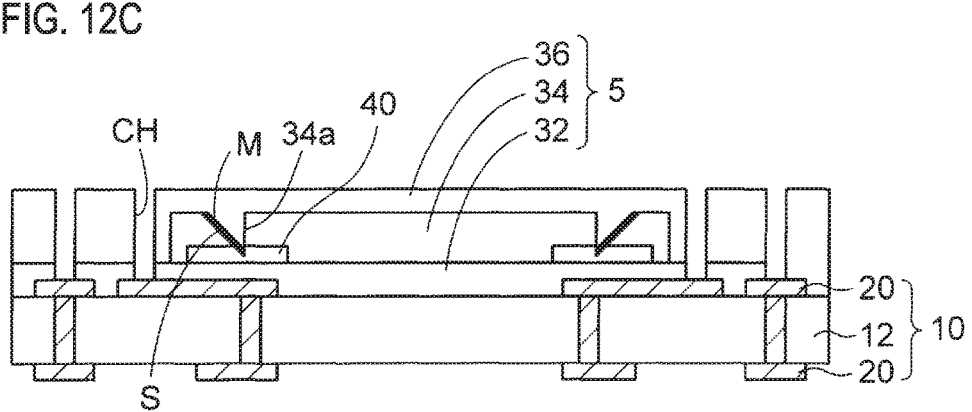
Figure 13A:
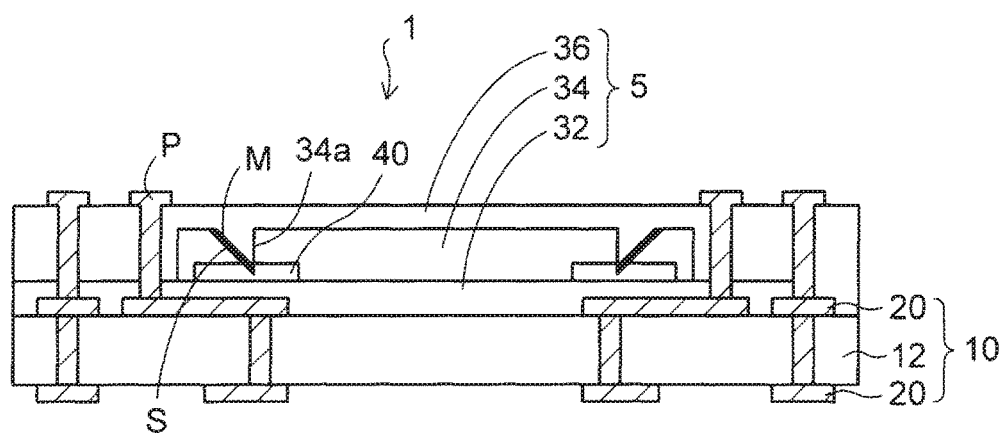
FIGS. 13A and 13B are a sectional view and a plan view depicting the optical waveguide device of the exemplary embodiment.
Figure 13B:
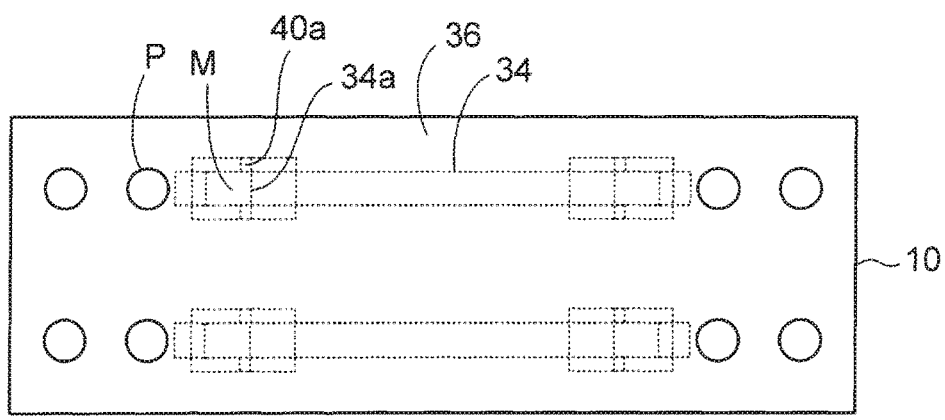

FIGS. 3A to 12C depict a method of manufacturing an optical waveguide device of an exemplary embodiment, and FIGS. 13A and 13B depict an optical waveguide device of the exemplary embodiment. In the below, while describing the method of manufacturing the optical waveguide device, a structure of the optical waveguide device is described.

Figure 3A:
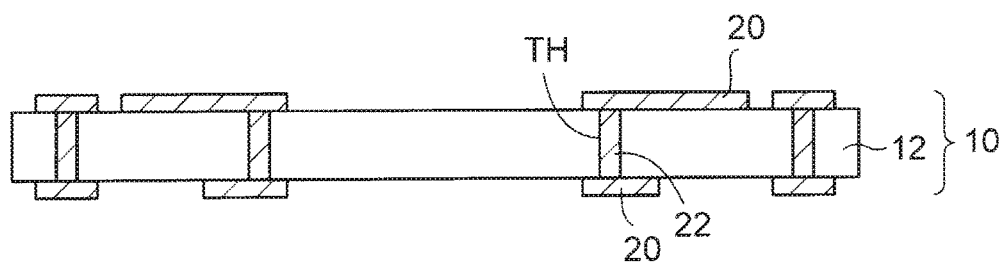
FIGS. 3A and 3B are a sectional view and a plan view depicting a method of manufacturing an optical waveguide device in accordance with an exemplary embodiment (1 thereof).
Figure 3B:
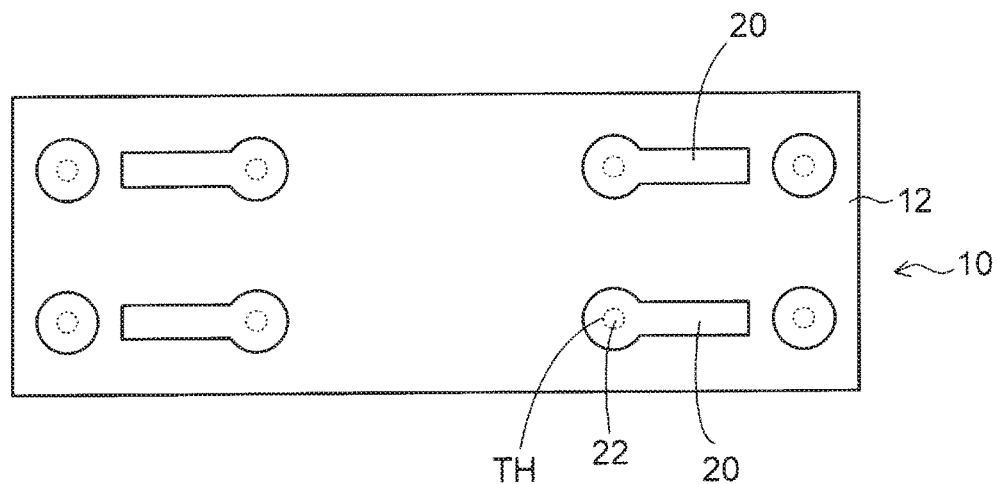

In the method of manufacturing the optical waveguide device of the exemplary embodiment, as shown in FIGS. 3A and 3B, a wiring substrate 10 configured to treat an electric signal is first prepared. FIG. 3B is a plan view of the wiring substrate 10 of FIG. 3A, as seen from above.

In the wiring substrate 10, wiring layers 20 are respectively formed on both surfaces of a substrate 12. The substrate 12 is formed with through-holes TH penetrating the same in a thickness direction. In the through-holes TH, through-conductors 22 are filled. The wiring layers 20 formed on both the surfaces are interconnected via the through-conductors 22. The wiring layer 20 and the through-conductor 22 are formed of copper or the like.

In the meantime, the wiring layers 20 on both the surfaces may be interconnected via a through-hole plating layer formed on sidewalls of the through-holes TH, and the remaining portions of the through-holes TH may be filled with a resin.

Also, the substrate 12 may be a rigid substrate or a flexible substrate. When a rigid substrate is used, the substrate 12 is formed of a glass epoxy resin or the like, for example.

Alternatively, when a flexible substrate is used, the substrate 12 is formed of a polyimide film or the like, for example. Also, the number of the wiring layers 20 to be stacked on both the surfaces of the substrate 12 can be arbitrarily set.

The through-holes TH of the wiring substrate 10 are formed by a drill, a laser or the like, and the wiring layers 20 and the through-conductors 22 are formed using photolithography and plating techniques or the like.

Figure 4:
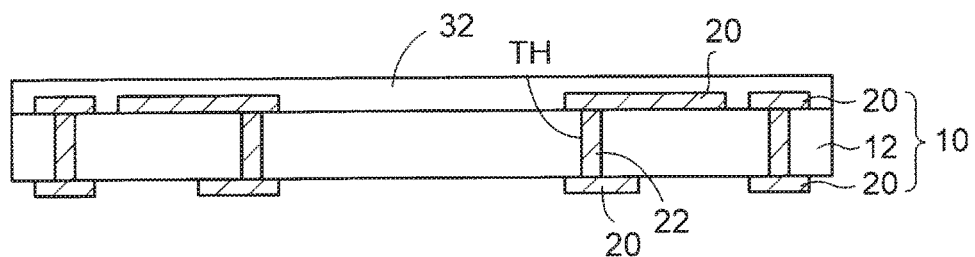
FIG. 4 is a sectional view depicting the method of manufacturing the optical waveguide device of the exemplary embodiment (2 thereof).

Subsequently, as shown in FIG. 4, a photosensitive resin layer (not shown) for obtaining a first cladding layer is formed on the wiring substrate 10 and is then subject to exposure/developing on the basis of the photolithography.

After that, the photosensitive resin layer is cured by heating processing of about 100° C. to 140° C. Thereby, a first cladding layer 32 is formed in an optical waveguide formation region on the wiring substrate. A thickness of the first cladding layer 32 is about 10 μm to 30 μm, for example.

As the photosensitive resin layer, a UV-curable epoxy resin or the like is preferably used. As a method of forming the photosensitive resin layer, a semi-cured (B-stage) photosensitive resin sheet may be bonded or a liquid photosensitive resin may be applied.

When forming the first cladding layer 32 over an entire surface without patterning the same, a non-photosensitive resin may be used.

The same resin is preferably used in processes of forming a core layer and a second cladding layer, which will be described later.

Figure 5A:
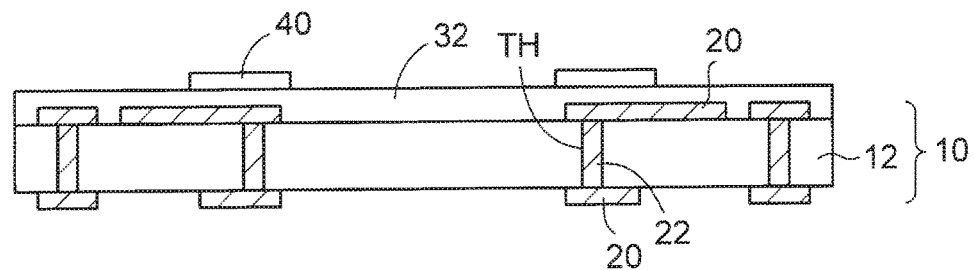
FIGS. 5A and 5B are a sectional view and a plan view depicting the method of manufacturing the optical waveguide device of the exemplary embodiment (3 thereof).
Figure 5B:
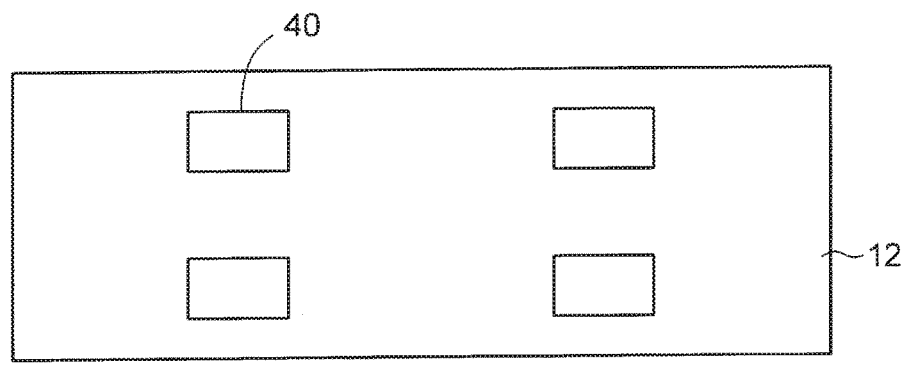

Subsequently, as shown in FIG. 5A, base protective layers 40 are formed into a certain pattern on the first cladding layer 32 at both ends-side of the optical waveguide formation region. FIG. 5B is a plan view of a structure of FIG. 5A, as seen from above.

Referring to FIG. 5B, the base protective layers 40 are arranged on regions of the first cladding layer 32 corresponding to parts at which recess portions for obtaining optical path conversion mirrors of core layers (which will be described later) are to be arranged.

In FIG. 5B, areas, in which two core layers are to be arranged, of the optical waveguide formation region are partially shown, and the base protective layers 40 are separately arranged in an island shape in regions corresponding to both end portions of the two core layers (not shown).

As a method of forming the base protective layers 40, a photosensitive resin layer (not shown) is first formed on the first cladding layer 32 and is then subjected to exposure/developing on the basis of the photolithography.

After that, the photosensitive resin layer is cured by heating processing of about 100° C. to 140° C. Thereby, the base protective layers 40 are formed with being patterned in an island shape on the first cladding layer 32. A thickness of the base protective layer 40 is about 5 to 15 μm, for example.

The base protective layer 40 is formed of a resin having a refractive index smaller than a refractive index of a core layer 34. More preferably, the base protective layer 40 is formed of a resin having the same refractive index as the first cladding layer 32. In this aspect, when forming an optical waveguide, the base protective layer 40 functions as a part of the first cladding layer 32.

Figure 6A:
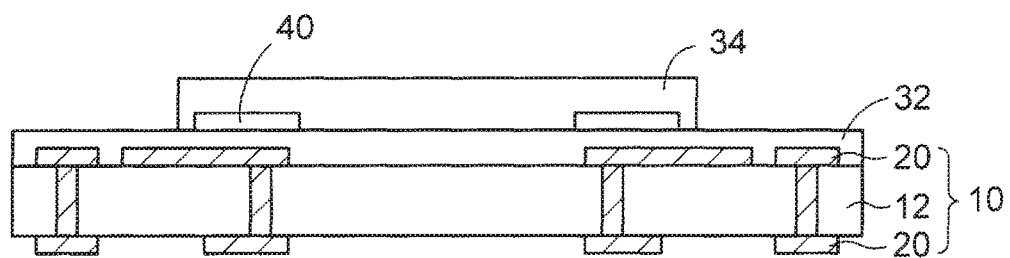
FIGS. 6A and 6B are a sectional view and a plan view depicting the method of manufacturing the optical waveguide device of the exemplary embodiment (4 thereof).

Subsequently, as shown in FIG. 6A, a photosensitive resin layer (not shown) for obtaining core layers is formed on the first cladding layer 32 and the base protective layers 40.

In addition, the photosensitive resin layer is subjected to exposure/developing on the basis of the photolithography and is then cured by heating processing of about 100° C. to 140° C. Thereby, core layers 34 are formed with being patterned on the first cladding layer 32 and the base protective layers 40.

Figure 6B:
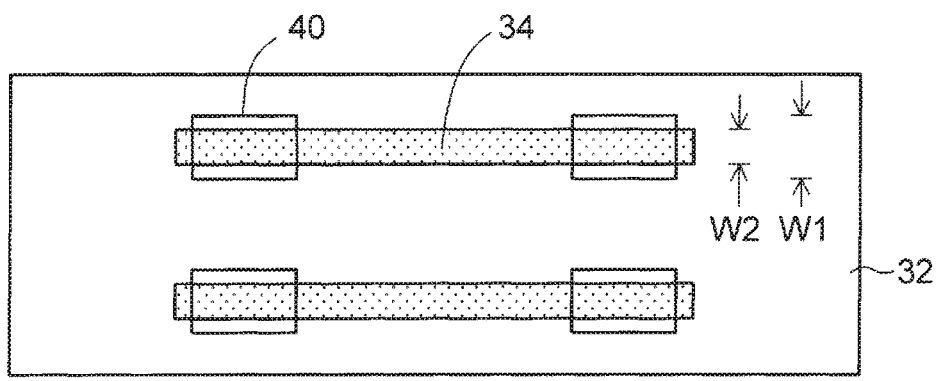

FIG. 6B is a plan view of a structure of FIG. 6A, as seen from above. Referring to FIG. 6B, the core layer 34 is formed so that both end portions are arranged on a pair of the base protective layers 40 at both ends-side of FIG. 5B. Also, the plurality of core layers 34 is arranged side by side in a band-shaped pattern on the first cladding layer 32.

In this way, the base protective layers 40 are respectively arranged below both end portions of the plurality of core layers 34. As described later, both end portions of the core layers 34 are formed with recess portions for obtaining optical path conversion mirrors by a rotary blade. At this time, the base protective layer 40 functions as a protective layer configured to prevent the first cladding layer 32, which is a base layer, from being cut by the rotary blade.

As shown in FIG. 6B, in a preferable example, a width W1 of the base protective layer 40 is set greater than a width W2 of the core layer 34, and both end portions in a width direction of the base protective layer 40 extend outwards beyond both side surfaces of the core layer 34. Alternatively, the width W1 of the base protective layer 40 may be the same as the width W2 of the core layer 34.

Like this, the width W1 of the base protective layer 40 is set to be equal to or greater than the width W2 of the core layer.

For example, the width W1 of the base protective layer 40 is set to be 5 μm to 50 μm and the width W2 of the core layer 34 is set to be 5 μm to 50 μm.

Figure 7A:
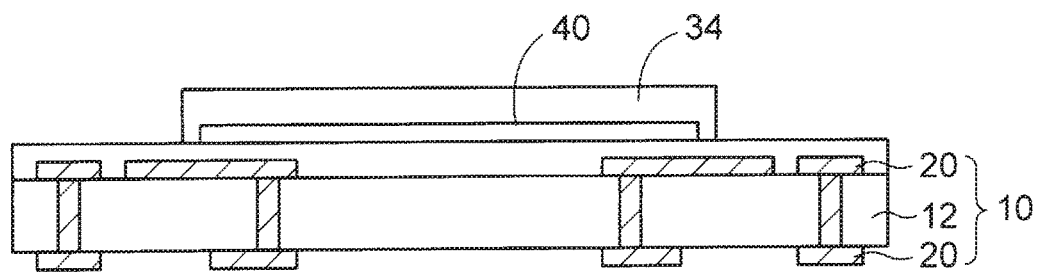
FIGS. 7A and 7B are a sectional view and a plan view depicting the method of manufacturing the optical waveguide device of the exemplary embodiment (5 thereof).
Figure 7B:
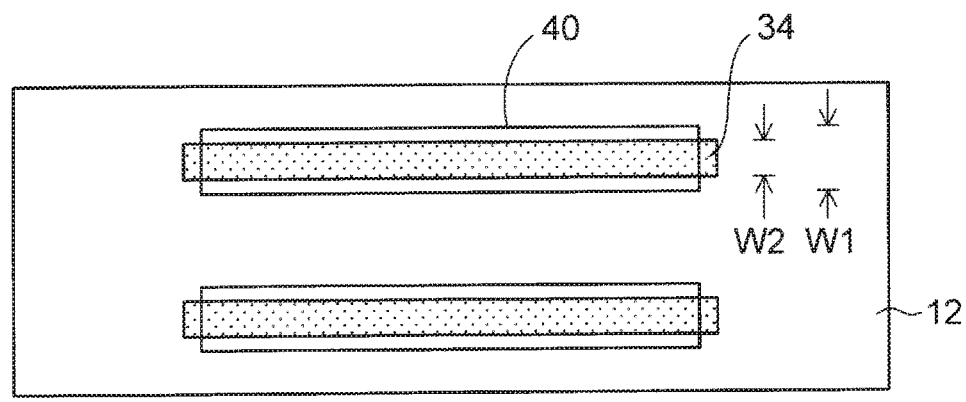

FIGS. 7A and 7B depict a modified embodiment of the pattern of the base protective layer 40. FIG. 7B is a plan view of a structure of FIG. 7A, as seen from above. As shown in FIGS. 7A and 7B, in the process of FIGS. 5A and 5B, the base protective layer 40 may be arranged as one long pattern from one end to the other end of the core layer 34.

In this case, each core layer 34 is arranged on one base protective layer 40. Also in this aspect, the width W1 of the base protective layer 40 is set greater than the width W2 of the core layer 34, and both end portions in the width direction of the base protective layer 40 extend outwards beyond both side surfaces of the core layer 34.

Meanwhile, in FIGS. 6A to 7B, side surfaces of both ends in a longitudinal direction of the core layer 34 are arranged at outermore sides than side surfaces of the base protective layer 40. However, the side surfaces of both ends in the longitudinal direction of the core layer 34 may be arranged on the base protective layer 40. In FIGS. 7A and 7B, the elements except for the base protective layer 40 are the same as FIGS. 6A and 6B.

In processes to be described later, the structure of FIGS. 6A and 6B is referred to.

Figure 8:
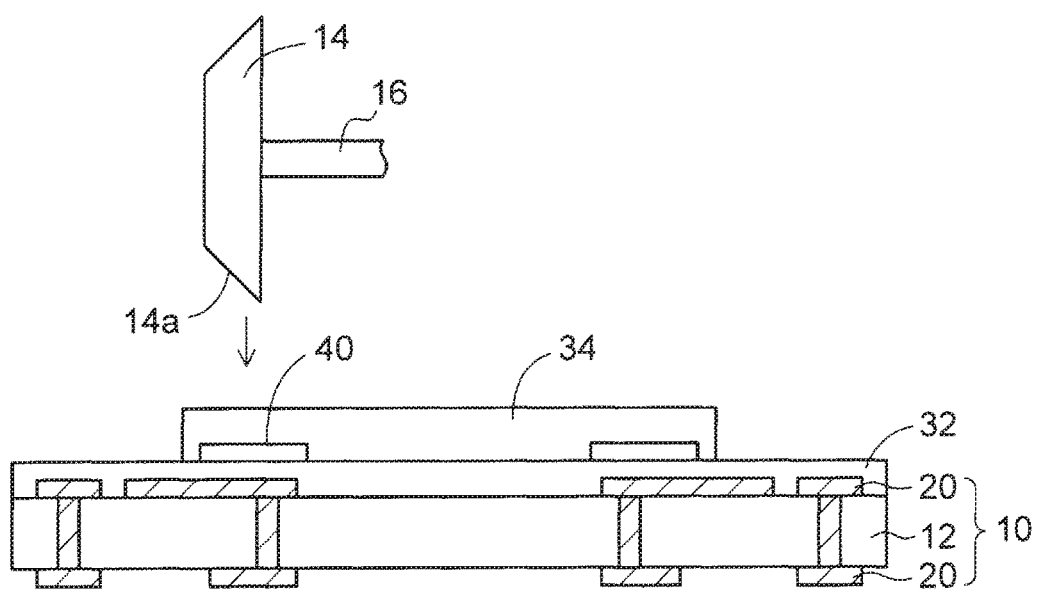
FIG. 8 is a sectional view depicting the method of manufacturing the optical waveguide device of the exemplary embodiment (6 thereof).

Subsequently, as shown in FIG. 8, a cutting device (not shown) having a rotary blade 14 is prepared. The rotary blade 14 is coupled to a rotary shaft 16 connected to a motor (not shown). The rotary blade 14 has an inclined surface 14a at a blade tip and can form a V-shaped recess portion having an inclined surface in a thickness direction from a surface of a member to be cut.

Also, the rotary blade 14 and the rotary shaft 16 are connected to a movement unit (not shown) and can move in a vertical direction and a horizontal direction. Thereby, the rotary blade 14 can move in the horizontal direction to cut the member to be cut with being adjusted to a predetermined height position.

By the rotary blade 14 of the cutting device, parts of both ends-side of the core layer 34, at which optical path conversion mirrors are to be arranged, are cut in the thickness direction.

Figure 9A:
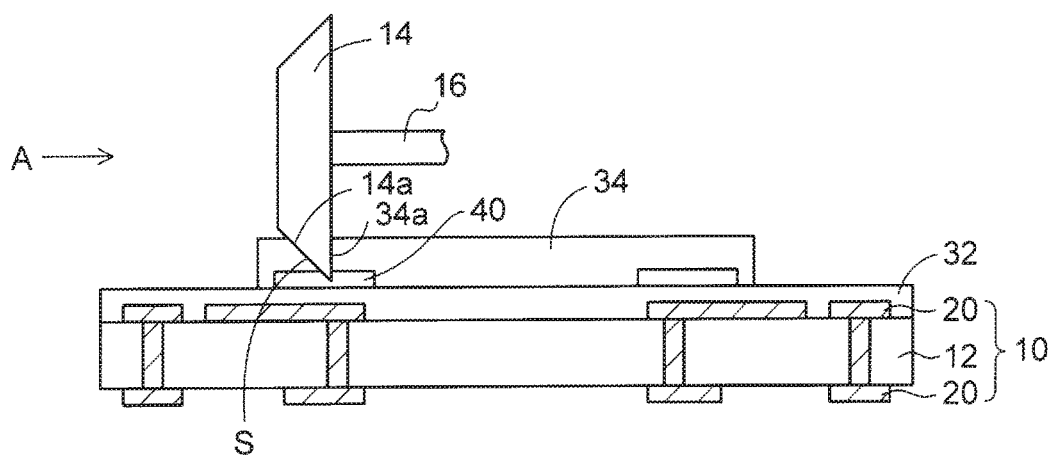
FIGS. 9A and 9B are a sectional view and a plan view depicting the method of manufacturing the optical waveguide device of the exemplary embodiment (7 thereof).
Figure 9B:
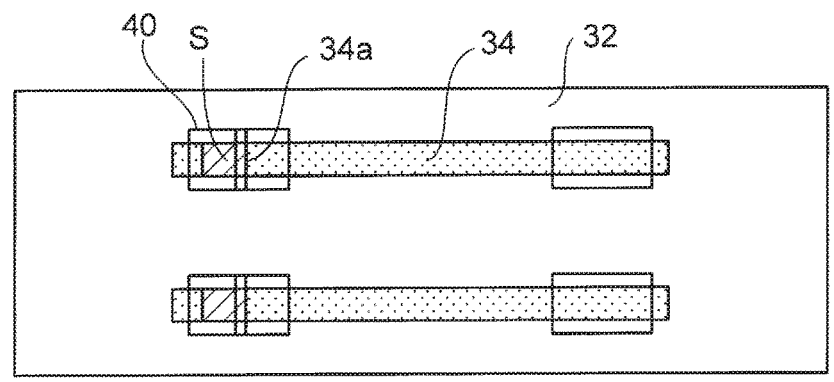

Thereby, as shown in FIG. 9A, a V-shaped recess portion 34a having an inclined surface S for converting an optical path by 90° is formed. The inclined surface S is formed with being preferably inclined by 45° relative to a surface of the wiring substrate 10.

Figure 10A:
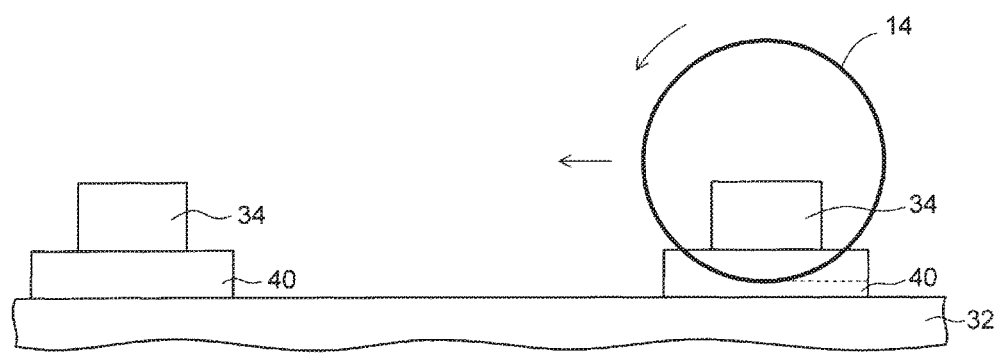
FIGS. 10A and 10B are sectional views depicting the method of manufacturing the optical waveguide device of the exemplary embodiment (8 thereof).
Figure 10B:
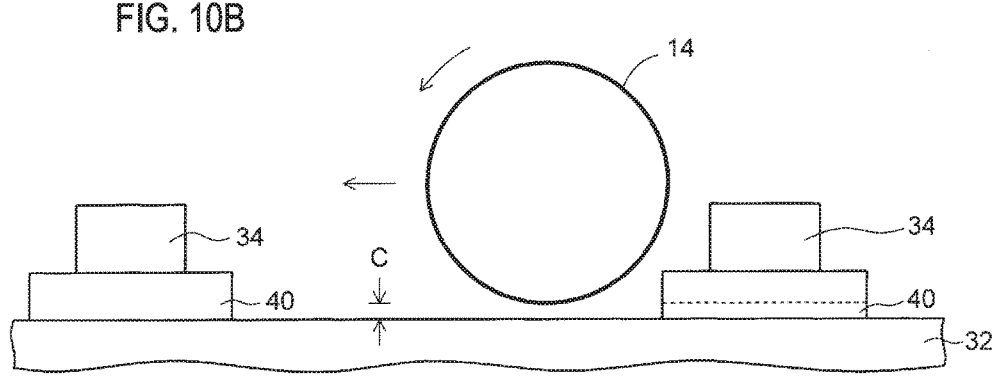

FIGS. 10A and 10B are views of pictorially showing as aspect of forming the recess portion 34a in the core layer 34 by the rotary blade 14 in the process of FIG. 9A, as seen from an A direction. In FIG. 10A, the rotary blade 14 is shown in a projection manner.

As shown in FIGS. 10A and 10B, in the exemplary embodiment, the base protective layer 40 is arranged below a part of the core layer 34 in which the recess portion 34a is to be formed. At a state where a height position of the blade tip of the rotary blade 14 is adjusted so that the blade tip is partway arranged in the thickness of the base protective layer 40, while the rotary blade is moved in the horizontal direction, it sequentially forms the recess portions 34a in the core layers 34 arranged side by side.

In this way, the recess portions 34a are collectively formed in the core layers 34 and the base protective layers 40 aligned in parallel.

Thereby, as shown in FIG. 10B, when the rotary blade 14 passes a region between the plurality of core layers 34, a gap C is formed between the blade tip of the rotary blade 14 and an upper surface of the first cladding layer 32.

In this way, the base protective layers 40 are arranged and locally raised on the first cladding layer 32 so that the first cladding layer 32 is not to be cut by the rotary blade 14.

Thereby, since the rotary blade 14 does not cut the first cladding layer 32 for which the cutting is not required, the wear of the rotary blade 14 is reduced, so that the lifespan thereof increases. Therefore, it is possible to reduce a replacement frequency of the rotary blade 14, so that it is possible to save the cost.

Moreover, since it is possible to increase the lifespan of the rotary blade 14, it is possible to form the recess portions 34a having a favorable inclined surface S and a desired depth with high yield rate.

Also, since the base protective layer 40 is arranged below the part to be cut of the core layer 34, the rotary blade 14 is prevented from reaching the first cladding layer 32. Further, even when the warpage of the wiring substrate 10 occurs, it is possible to prevent the rotary blade 14 from reaching the first cladding layer 32 by adjusting the thickness of the base protective layer 40.

Thereby, it is possible to avoid a situation where the rotary blade 14 penetrates the first clad 32 and reaches the wiring layer 20 of the wiring substrate 10. Therefore, it is possible to prevent a peeling from occurring at an interface between the wiring layer 20 and the first cladding layer 32 in a region below the recess portion 34a.

By the above method, as shown in FIGS. 11A and 11B, the recess portions 34a having the inclined surface S are respectively formed at both end portions of the plurality of core layers 34.

FIG. 11B is a plan view of a structure of FIG. 11A, as seen from above, and FIG. 11C is a partially enlarged plan view of the left recess portion 34a of the core layer 34 of FIG. 11B.

Referring to the partially enlarged plan view of FIG. 11C, a slit 40a communicating with the recess portion 34a of the core layer 34 is formed at both end portions of the base protective layer 40 extending beyond the side surfaces in the width direction of the core layer 34. The slit 40a of the base protective layer 40 is formed simultaneously when forming the recess portion 34a in the core layer 34 with the rotary blade 14.

At this time, the base protective layer 40 is arranged as a base layer of the core layer 34 and the rotary blade 14 is moved in the horizontal direction at the same height position. Since the core layer 34 does not exist at both end portions in the width direction of the base protective layer 40, the base protective layer 40 is cut only by the tip portion of the rotary blade 14, so that the slit 40a is formed.

For this reason, a depth of the slit 40a of the base protective layer 40 is shallower than a depth of the recess portion 34a of the core layer 34.

Also, as shown in FIG. 11B, since the first cladding layer 32 in the region between the plurality of core layers 34 is not contacted to the rotary blade 14, the first cladding layer 32 is not formed with a slit.

Subsequently, as shown in FIG. 12A, a light reflective metal layer is partially formed on the inclined surfaces S of the recess portions 34a of the core layers 34 by mask deposition or the like, so that optical path conversion mirrors M are obtained. As the light reflective metal, gold, aluminum or the like can be used.

Then, as shown in FIG. 12B, a photosensitive resin layer (not shown) for obtaining a second cladding layer is formed on the first cladding layer 32 and the core layers 34 of FIG. 12A. In addition, the photosensitive resin layer is subjected to exposure/developing on the basis of the photolithography and is then cured by the heating processing of about 100° C. to 140° C.

Thereby, a second cladding layer 36 covering the core layers 34 is formed on the first cladding layer 32. A thickness of the second cladding layer 36 is about 30 µm to 50 µm, for example. The second cladding layer 36 is formed with embedding therein the recess portions 34a and optical path conversion mirrors M of the core layers 34, and an upper surface thereof is flat.

Thereby, an optical waveguide 5 in which the first cladding layer 32, the core layer 34 and the second cladding layer 36 are sequentially formed from below is obtained. The optical waveguide 5 has a structure where the core layer 34 is surrounded by the first cladding layer 32 and the second cladding layer 36.

In the optical waveguide 5, the refractive index of the core layer 34 is set greater than the refractive indexes of the first cladding layer 32 and the second cladding layer 36.

Subsequently, as shown in FIG. 12C, the second cladding layer 36 and the first cladding layer 32 are subjected to laser processing, so that connection holes CH reaching the wiring layer 20 of the wiring substrate 10 are formed.

Alternatively, the connection holes CH may be formed by the photolithography. In this case, first holes are formed on the wiring layer 20 of the wiring substrate 10 in the process of forming the first cladding layer 32 (FIG. 4).

In addition, in the process of forming the second cladding layer 36 (FIG. 12B), second holes communicating with the first holes of the first cladding layer 32 are formed. In this way, the connection holes CH are formed from the first holes and the second holes.

Subsequently, as shown in FIG. 13A, connection pads P to be connected to the wiring layer 20 of the wiring substrate 10 through via conductors in the connection holes CH are formed on the second cladding layer 36.

The connection pads P are formed by a semi-additive method, for example. Specifically, a seed layer (not shown) is formed in the connection holes CH and on the second cladding layer 36. Then, a plating resist layer (not shown) having openings provided in a region including the connection holes CH is formed on the seed layer.

Thereafter, a metal plating layer (not shown) is formed from insides of the connection holes CH to the openings of the plating resist layer by an electrolytic plating in which the seed layer is used as a plating power feeding path. In addition, after peeling off the plating resist layer, the seed layer is etched using the metal plating layer as a mask. Thereby, the connection pads P are formed from the seed layer and the metal plating layer.

By the above processes, an optical waveguide device 1 of the exemplary embodiment is obtained.

As shown in FIG. 13A, the optical waveguide device 1 of the exemplary embodiment has the wiring substrate 10 described in FIGS. 3A and 3B. In the wiring substrate 10, the wiring layers 20 are respectively formed on both the surfaces of the substrate 12, and the wiring layers 20 on both the surfaces are interconnected via the through-conductors 22.

The first cladding layer 32 is formed on the wiring substrate 10. The base protective layers 40 are formed into a certain pattern on the first cladding layer 32. Also, the core layers 34 are formed on the first cladding layer 32 and the base protective layers 40.

In addition, the recess portions 34a having the inclined surfaces S are formed from the upper surfaces of the core layers 34 to the parts in the thicknesses of the base protective layers 40. The inclined surfaces S of the recess portions 34a are formed with the optical path conversion mirrors M of the metal layer.

As described above, according to the exemplary embodiment, the recess portions 34a of the core layers 34 are formed at both end portions of the core layers 34, and the base protective layers 40 are separately arranged in the regions corresponding to the recess portions 34a at both end portions.

As described in the above manufacturing method, the base protective layer 40 functions as the protective layer configured to prevent the first cladding layer 32 (base layer) from being cut by the rotary blade 14 when forming the recess portion 34a in the core layer 34 by the rotary blade 14. To this end, the base protective layers 40 are separately arranged in an island shape in the regions in which the recess portions 34a of the core layers 34 are to be formed.

Alternatively, as described in FIGS. 7A and 7B, the base protective layer 40 may be arranged as one long pattern from one end to the other end of the core layer 34.

In this way, the base protective layers 40 may be separately arranged in an island shape in the regions corresponding to both end portions at which the recess portions 34a of the core layers 34 are to be arranged or the base protective layer 40 may be formed in a pattern substantially corresponding to the entire core layer 34.

FIG. 13B is a plan view of the wiring substrate 10 of FIG. 13A, as seen from above. As shown in FIGS. 13B and 6B, the width of the base protective layer 40 is set greater than the width of the core layer 34. Alternatively, the width of the base protective layer 40 may be the same as the width of the core layer 34.

Also, as shown in FIG. 13B, the slit 40a communicating with the recess portion 34a of the core layer 34 is formed at both end portions in the width direction of the base protective layer 40, as described in FIG. 11C.

Also, the depth of the slit 40a formed at both end portions of the base protective layer 40 is shallower than the depth of the recess portion 34a of the core layer 34.

In the meantime, as shown in FIG. 13B, the slit formed by the rotary blade 14 is not formed in the first cladding layer 32 in the region between the plurality of core layers 34, as described in FIG. 11B.

The reason is that when forming the recess portions 34a in the plurality of core layers 34 by the rotary blade 14, the base protective layers 40 are arranged, so that the gap C is formed between the first cladding layer 32 and the rotary blade 14, as described in FIGS. 10A and 10B.

The refractive index of the base protective layer 40 is set smaller than refractive index of the core layer 34, and is more preferably set to be the same as the refractive index of the first cladding layer 32.

Also, the second cladding layer 36 is formed on the first cladding layer 32 and the core layers 34. The second cladding layer 36 is formed with embedding therein the recess portions 34a of the core layers 34, and the upper surface thereof is flat.

The optical waveguide 5 is formed from the first cladding layer 32, the core layer 34 and the second cladding layer 36.

Also, the second cladding layer 36 and the first cladding layer 32 is formed with the connection holes CH reaching the wiring layer 20 of the wiring substrate 10. On the second cladding layer 36, the connection pads P connected to the wiring layer 20 of the wiring substrate 10 through the via conductors in the connection holes CH are formed.

In the optical waveguide device 1 of the exemplary embodiment, the base protective layer 40 is formed below the part in which the recess portion 34a of the core layer 34 is formed. The base protective layer 40 functions as the protective layer configured to prevent the first cladding layer 32 (base layer) from being cut when forming the recess portion 34a in the core layer 34 by the rotary blade 14.

For this reason, it is possible to avoid the situation where the rotary blade 14 penetrates the first clad 32 and reaches the wiring layer 20 of the wiring substrate 10. Therefore, it is possible to prevent the peeling from occurring at the interface between the wiring layer 20 and the first cladding layer 32 in the region below the optical path conversion mirror M. Thereby, it is possible to improve the reliability of the optical waveguide device.

Subsequently, a method of mounting an optical element to the optical waveguide device 1 of FIG. 13A is described.

Figure 14A:
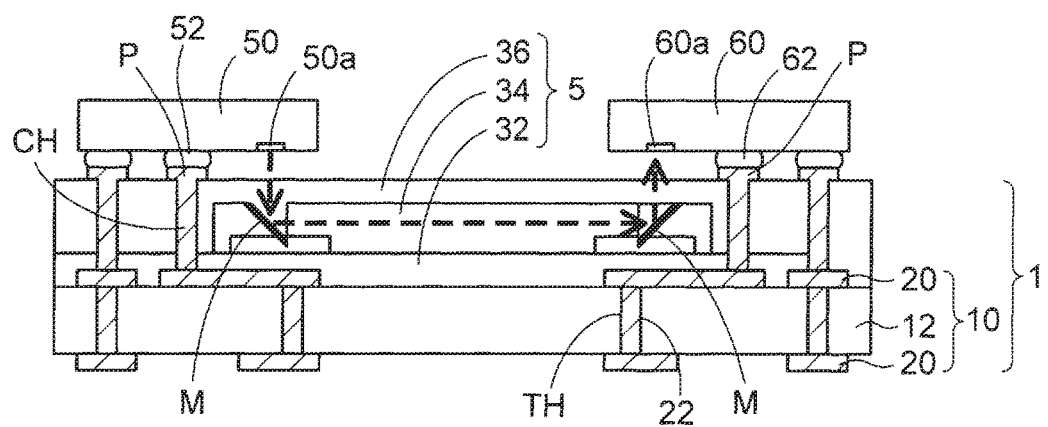
FIGS. 14A and 14B are a sectional view and a plan view depicting a state where optical elements are mounted on the optical waveguide device of the exemplary embodiment.
Figure 14B:
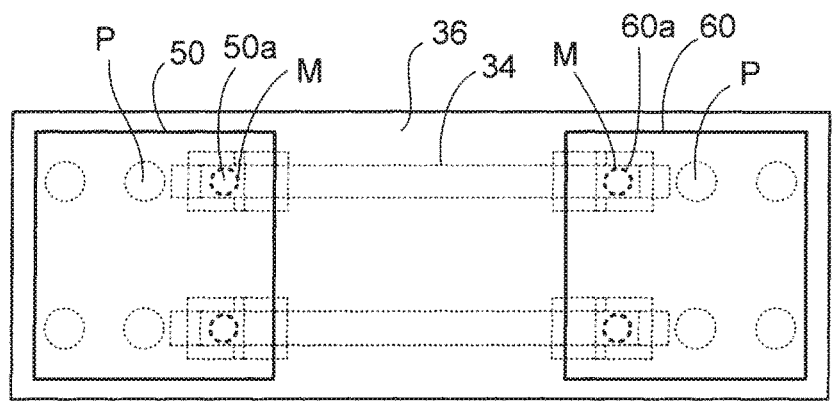

As shown in FIG. 14A, a light emitting element 50 is connected to the connection pads P at one ends-side of the core layers 34 of the optical waveguide device 1 by solder electrodes 52. The light emitting element 50 is an example of the optical element.

The light emitting element 50 has a plurality of light emitting units 50a on its lower surface, and the light emitting units 50a are optically coupled to the optical path conversion mirrors M on the respective optical paths of the optical waveguide device 1. As the light emitting element 50, a vertical cavity surface emitting laser (VCSEL) is preferably used.

Also, a light receiving element 60 is connected to the connection pads P at the other ends-side of the core layers 34 of the optical waveguide device 1 by solder electrodes 62. The light receiving element 60 is an example of the optical element.

The light receiving element 60 has a plurality of light receiving units 60a on its lower surface, and the light receiving units 60a are optically coupled to the optical path conversion mirrors M on the respective optical paths of the optical waveguide device 1. As the light receiving element 60, a photo diode is preferably used.

A underfill resin may be respectively filled below the light emitting element 50 and the light receiving element 60.

In the optical waveguide device 1 of the exemplary embodiment, an electric signal output from a driver element (not shown) is supplied to the light emitting element 50 and the light is emitted downwards from the light emitting unit 50a of the light emitting element 50, as shown with an arrow in FIG. 14A.

The light emitted from the light emitting element 50 passes through the second cladding layer 36 and reaches the optical path conversion mirror M of the optical waveguide device 1. Then, the light is reflected on the optical path conversion mirror M, the optical path is converted by 90° and the light is then introduced into the core layer 34.

The light introduced into the core layer 34 propagates with being repeatedly totally reflected in the core layer 34 and reaches the optical path conversion mirror M at the other end-side. Then, the light is reflected on the optical path conversion mirror M at the other end-side, the optical path is converted by 90°, and the light passes through the second cladding layer 36 and is introduced into the light receiving unit 60*a* of the light receiving element 60.

The light receiving element 60 converts the optical signal into an electric signal, and the electric signal is supplied to an amplifier element (not shown).

In the optical waveguide device 1 of the exemplary embodiment, since the peeling does not occur in the region below the optical path conversion mirror M, the optical waveguide device is manufactured with the favorable yield rate and the reliability of the optical coupling with the optical element is high.

This disclosure further encompasses various exemplary embodiments, for example, described below.

1. A method of manufacturing an optical waveguide device, the method comprising:
   forming a first cladding layer on a wiring substrate;
   forming a base protective layer having a certain pattern on the first cladding layer;
   forming a core layer on the first cladding layer and the base protective layer;
   forming a recess portion having an inclined surface from the core layer to the base protective layer by a rotary blade;
   forming an optical path conversion mirror on the inclined surface; and
   forming a second cladding layer on the first cladding layer and the core layer,
   wherein a refractive index of the base protective layer is smaller than a refractive index of the core layer, and
   wherein a width of the base protective layer is set equal to or greater than a width of the core layer.

2. The method according to claim 1, wherein in the forming the base protective layer, the base protective layer is separately arranged in regions corresponding to both end portions of the core layer, and
   wherein in the forming the recess portion, the recess portion of the core layer is formed at both end portions of the core layer, respectively.

3. The method according to claim 1 or 2, wherein in the forming the base protective layer, the width of the base protective layer is set greater than the width of the core layer, and
   wherein in the forming the recess portion, a slit communicating with the recess portions is formed at both end portions in a width direction of the base protective layer.

4. The method according to one of claims 1 to 3, wherein in the forming the core layer, a plurality of the core layers is formed side by side, and
   wherein in the forming the recess portion, when forming the recess portions in the plurality of core layers, a gap is formed between the rotary blade and the first cladding layer.

5. The method according to one of claims 1 to 4, further comprising:
   connecting, to the wiring substrate, an optical element to be optically coupled to the optical path conversion mirror, after the forming the second cladding layer.

What is claimed is:

1. An optical waveguide device comprising:
   a wiring substrate;
   a first cladding layer formed on the wiring substrate;
   a plurality of base protective layers formed directly on a first surface of the first cladding layer and arranged side by side, the first surface of the first cladding layer being opposite to a second surface of the first cladding layer, the second surface of the first cladding layer facing the wiring substrate;
   a plurality of core layers formed on the first surface of the first cladding layer, arranged side by side, and each disposed on a respective one of the plurality of base protective layers to form a plurality of core layer-base protective layer pairings which each include one core layer disposed on one base protective layer;
   a plurality of recess portions, each recess portion defined as a continuous cut into the core layer and base protective layer of a respective one core layer-base protective layer pairing, and each recess portion having an inclined surface defined in the core layer and the base protective layer;
   a plurality of optical path conversion mirrors, each optical path conversion mirror being formed on the inclined surface of a respective one of the plurality of recess portions; and
   a second cladding layer formed on the first cladding layer and the plurality of core layers,
   wherein a refractive index of the plurality of base protective layers is smaller than a refractive index of the plurality of core layers, and
   wherein, in each of the plurality of core layer-base protective layer pairings, a width, in a width direction which perpendicularly intersects an optical propagation direction of the plurality of core layers in a top plan view, of base protective layer is equal to or greater than a width in the width direction of the core layer.

2. The optical waveguide device according to claim 1, wherein, in each of the plurality of core layer-base protective layer pairings, the width in the width direction of the base protective layer is set greater than the width in the width direction of the core layer, and
   wherein a slit is formed at both end portions in the width direction in each of the plurality of base protective layers, each slit communicating with a respective one of the plurality of recess portions.

3. The optical waveguide device according to claim 1, wherein the plurality of base protective layers is formed of a resin having the same refractive index as the first cladding layer.

4. The optical waveguide device according to claim 1, further comprising:
   an optical element connected to the wiring substrate and optically coupled to the optical path conversion mirror.

5. The optical waveguide device according to claim 1, wherein the plurality of base protective layers are spaced from each other, the plurality of core layers are spaced from each other, and the plurality of core layer-base protective layer pairings are spaced from each other.

* * * * *